United States Patent
Clark (10) Patent No.: US 8,999,421 B2
(45) Date of Patent: Apr. 7, 2015

(54) CARTRIDGE RETAINING DEVICE, BREWER IN COMBINATION WITH SAME, AND METHOD OF USING SAID DEVICE

(71) Applicant: Bunn-O-Matic Corporation, Springfield, IL (US)

(72) Inventor: Charles H. Clark, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 13/794,603

(22) Filed: Mar. 11, 2013

(65) Prior Publication Data

US 2013/0263423 A1  Oct. 10, 2013

Related U.S. Application Data

(63) Continuation-in-part of application No. 13/634,792, filed as application No. PCT/US2011/028395 on Mar. 14, 2011.

(60) Provisional application No. 61/609,145, filed on Mar. 9, 2012, provisional application No. 61/313,737, filed on Mar. 13, 2010.

(51) Int. Cl.
*A47J 31/40* (2006.01)
*A47J 31/06* (2006.01)

(52) U.S. Cl.
CPC ............ *A47J 31/407* (2013.01); *A47J 31/0642* (2013.01)

(58) Field of Classification Search
USPC ................................ 426/433; 99/295; 29/428
See application file for complete search history.

(56) References Cited

U.S. PATENT DOCUMENTS

| | | | |
|---|---|---|---|
| 3,092,012 A * | 6/1963 | Ruhnke | ........................... 99/307 |
| 3,793,934 A | 2/1974 | Martin et al. | |
| 4,094,233 A | 6/1978 | Martin | |
| 4,995,978 A * | 2/1991 | Van de Gang | ................ 210/474 |
| 5,285,717 A | 2/1994 | Knepler | |
| 5,634,394 A | 6/1997 | Cortese | |
| 5,829,340 A | 11/1998 | Yang | |
| 5,870,943 A | 2/1999 | Levi et al. | |
| 7,350,455 B2 | 4/2008 | Vetterli | |
| 7,770,512 B2 | 8/2010 | Albrecht | |
| 2003/0071056 A1* | 4/2003 | Hale | ............... 222/83 |

(Continued)

OTHER PUBLICATIONS

Search Report & Written Opinion issued in app. No. PCT/US2011/028395 (2011).

(Continued)

*Primary Examiner* — Anthony Weier
(74) *Attorney, Agent, or Firm* — Barnes & Thornburg LLP (57) ABSTRACT

A cartridge retaining device is disclosed for use with a beverage brewing apparatus. The device includes a base with a cover. A beverage making cartridge is placed within the base and the cover is positioned over the cartridge. Engagement of the cover over the cartridge in the base causes at least two probes, one above carried on the cover and one below generally carried on or proximate to the base to penetrate or otherwise open the cartridge. The device is structured to operate so that the cover probe penetrates the cartridge before the base probe opens a corresponding portion of the cartridge. The device is adapted for separate engagement with a brewer whereby heated water is dispensed from the brewer into the device for brewing a beverage retained within the cartridge and dispensing the brewed beverage from a lower section of the body of the device.

23 Claims, 9 Drawing Sheets

(56) References Cited

U.S. PATENT DOCUMENTS

| | | |
|---|---|---|
| 2007/0175335 A1* | 8/2007 | Liverani et al. ................. 99/279 |
| 2008/0011865 A1 | 1/2008 | Goeckner |
| 2009/0220650 A1* | 9/2009 | Ozanne .......................... 426/78 |
| 2010/0077928 A1* | 4/2010 | Schmed et al. ................. 99/295 |
| 2011/0200726 A1 | 8/2011 | Tinkler et al. |
| 2013/0189400 A1* | 7/2013 | Pribus et al. .................. 426/115 |

OTHER PUBLICATIONS

U.S. Appl. No. 13/634,792, filed Sep. 13, 2012.

* cited by examiner

CARTRIDGE RETAINING DEVICE, BREWER IN COMBINATION WITH SAME, AND METHOD OF USING SAID DEVICE

CROSS-REFERENCE TO RELATED APPLICATIONS

This application is a continuation-in-part of U.S. patent application Ser. No. 13/634,792, filed Sep. 13, 2012, which is a U.S. nationalization under 35 U.S.C. §371 of International Application No. PCT/US2011/028395, filed Mar. 14, 2011, which claims priority from U.S. Provisional Application No. 61/313,737 filed Mar. 13, 2010. The subject application also claims benefit of priority under 35 U.S.C. §119(e) to U.S. Provisional Application No. 61/609,145 filed Mar. 9, 2012. The disclosures set forth in the referenced applications are incorporated herein by reference in their entireties, including all the information as originally submitted to the United States Patent and Trademark Office.

BACKGROUND

Beverage making apparatus has been produced which include a reservoir for holding a portion of heated water. The reservoir includes an inlet into the reservoir and an outlet from the reservoir and a heating element in association with the reservoir. Water is supplied to the reservoir, heated, and then moved to a spray head for dispensing over and/or into a beverage making substance. Heated water dispensed over and/or into the beverage making substance infuses the substance and produces a beverage.

This background information is provided to provide some information believed by the applicant to be of possible relevance to the present disclosure. No admission is intended, nor should such admission be inferred or construed, that any of the preceding information constitutes prior art against the present invention. Other aims, objects, advantages and features of the invention will become more apparent upon reading of the following non-restrictive description of specific embodiments thereof, given by way of example only with reference to the accompanying drawings.

BRIEF DESCRIPTION OF THE DRAWINGS

The present disclosure will be described hereafter with reference to the attached drawings which are given as a non-limiting example only, in which.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Terms including beverage, brewed, brewing, brewing substance, brewed liquid, and brewed beverage as may be used herein are intended to be broadly defined as including, but not limited to, the brewing of coffee, tea and any other beverages. This broad interpretation is also intended to include, but is not limited to any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to including, but is not limited to beverage substances such as ground coffee, tea, liquid beverage concentrate, powdered beverage concentrate, flaked, granular, freeze dried or other forms of materials including liquid, gel, crystal or other forms of beverage or food materials to obtain a desired beverage or other food product.

Beverage ingredients will be described in the present application and will be generally referred to as "coffee". However, it should be understood that the term beverage ingredient should be broadly interpreted regardless of reference to beverage ingredient or coffee. Also, the characteristics or form of the beverage ingredient can be any variety of ingredients which are currently known or hereafter developed. The form of the beverage ingredient may include powder, liquid, gel, crystal, flake, freeze-dried and any other form or state regardless of temperature, phase or other characteristics. Reference to beverage dispensing includes reconstituting, brewing, steeping or any other form of combining a dilution ingredient with a beverage ingredient.

Moreover, while "beverage" is referred to, it is envisioned that any variety of food ingredients could be placed in an ingredient container to reconstitute a desired food. In this regard, the food could take the form of juice, coffee, tea, other flavored beverages, as well as other foods. Furthermore, use of a dilution ingredient is to be broadly interpreted. While "water" is referred to for convenience throughout the application it should be understood that any variety of dilution ingredients could be used with the present application.

While the formats of the beverage ingredient containers are generally described as a "pod" and "cartridge" any variety of additional formats could be employed. Furthermore, while a pod or cartridge of ordinary configuration and dimension is described, any variety of sizes could be used. In this regard, the beverage dispenser could dispense a large quantity of beverage or individual single serving cups. The reference to the beverage ingredient container should be broadly interpreted and should not be limited.

The foregoing terms as well as other terms should be broadly interpreted throughout this application to include all known as well as all hereafter discovered versions, equivalents, variations and other forms of the abovementioned terms as well as other terms. The present disclosure is intended to be broadly interpreted and not limited.

As shown in the figures, a removable container retaining drawer or holder 200 is provided. The drawer includes a base 202 with a cover 204 overlying an opening or mouth 300 of the base 202. The handle 206 extends from the base 202 for gripping the assembly for insertion into and removal from a brewing apparatus. Although not explicitly shown in the present set of drawings or specification, the apparatus is the type as shown in the corresponding PCT application, Application No. PCT/US2011/028395, which is incorporated herein by reference. The brewer includes a spray head which interfaces with a recessed area 210 of the cover 204. The spray head delivers water to the water aperture 212 for use in infusing a beverage substance retained in the holder 200.

The holder 200 is attached to the brewer by use of rails 220 which define channels 222 on each side of the holder 200. The rails 220 and channels 222 engage corresponding protrusions or ribs on the brewer to engage the holder 200 on the brewer. The brewer as presented in the present application and the related PCT application as identified above allows for multiple beverage brewing platforms to be used with a single brewer. In this regard, the PCT application discloses a holder which accommodates a pod as well as a cartridge. The present application includes alternative embodiment and improvement over the cartridge holder disclosed in the PCT application. A hinge assembly 230 couples the cover 204 to the base 202 allowing a vertical movement and hinged displacement of the cover 204 relative to the base 202. An over center engaging handle or latch 232 is provided on the cover 202 to retain the cover 202 in a closed position.

Figure 1:
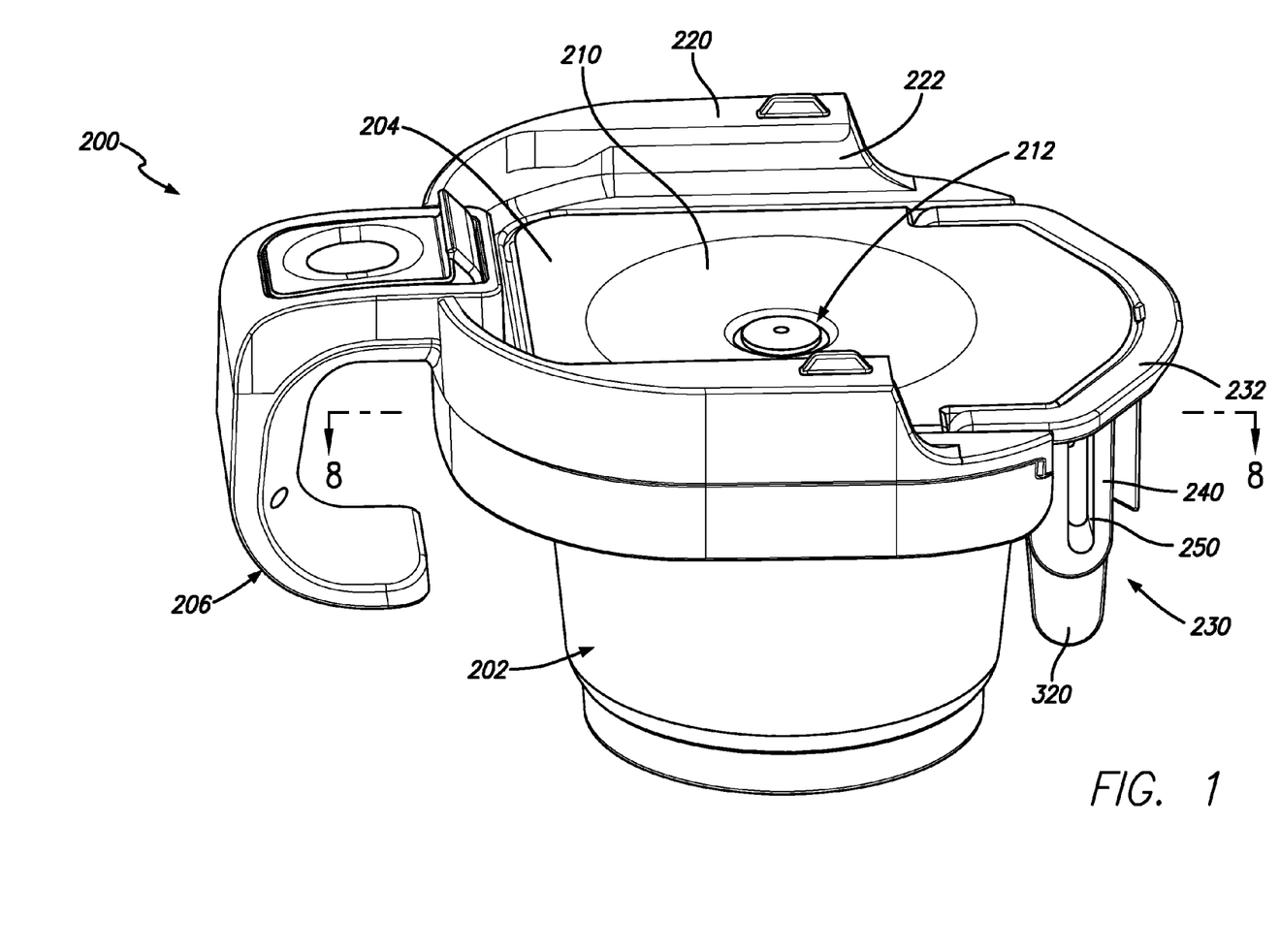
FIG. 1 is a an enlarged perspective view of a cartridge retaining device or holder with a grip, having a base which defines a cavity (see FIG. 4) with a cover including a water inlet aperture, and rails defining channels for attachment to a brewer.
Figure 2:
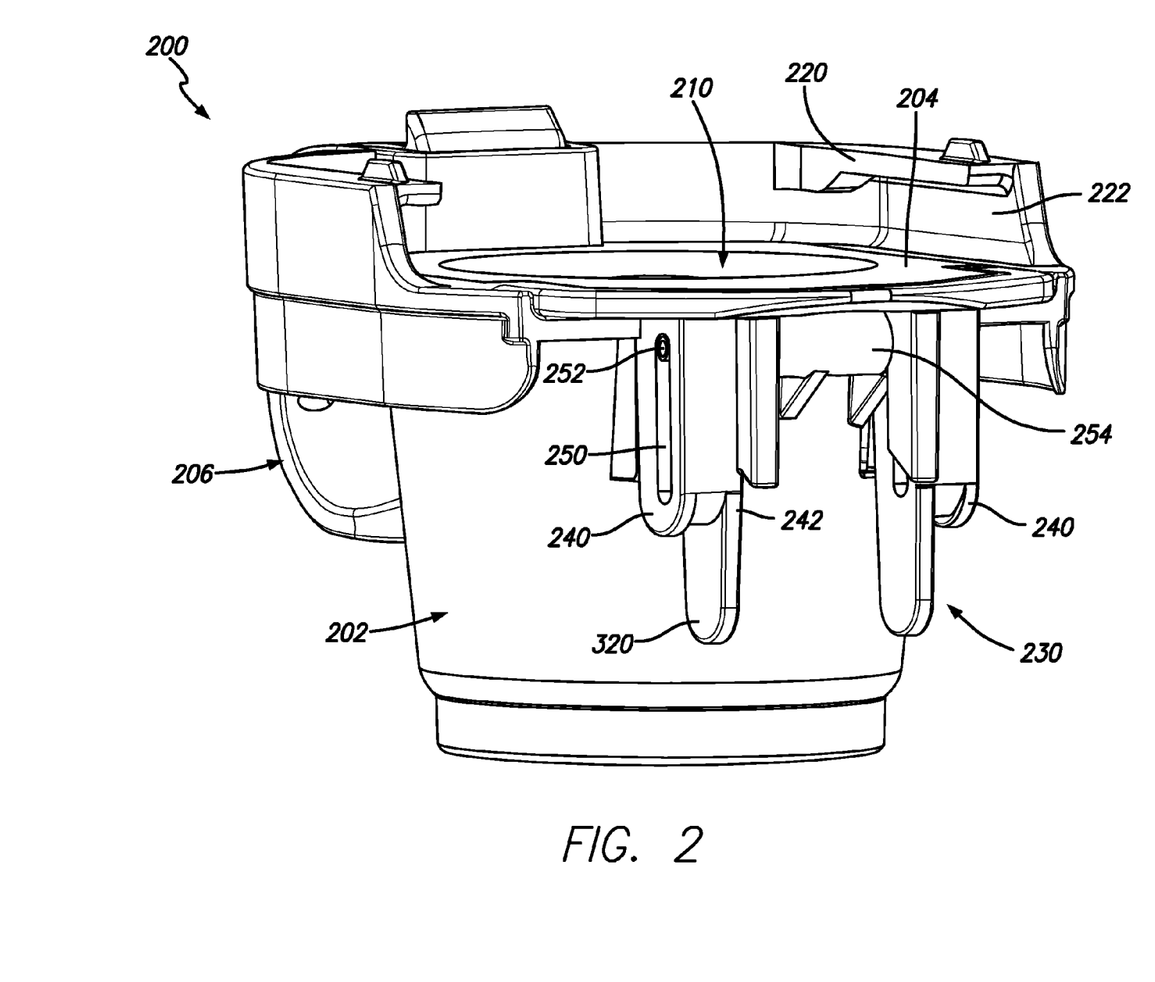
FIG. 2 is a front perspective view of the holder as shown in FIG. 1 showing additional structures related to the hinging and retention of the cover relative to the base by use of a handle latch.

FIG. 2 shows a front perspective view of the holder 200 further showing the rail 220 and channels 222. The hinge assembly 230 includes an outer hinge 240 and a hinge guide 242. The hinge guide 242 extends from the base 202 to provide secure guidance of the cover 204 relative to the base 202. The outer hinge portion 240 includes elongated paths 250. A central shaft 252 extends through the paths 250 of the outer hinged portion 240 and the inner hinged portions 242. The shaft 250 generally is secured in the central hub 254 to allow movement of the covered 204 along the orientation of travel defined by the paths 250.

Figure 3:
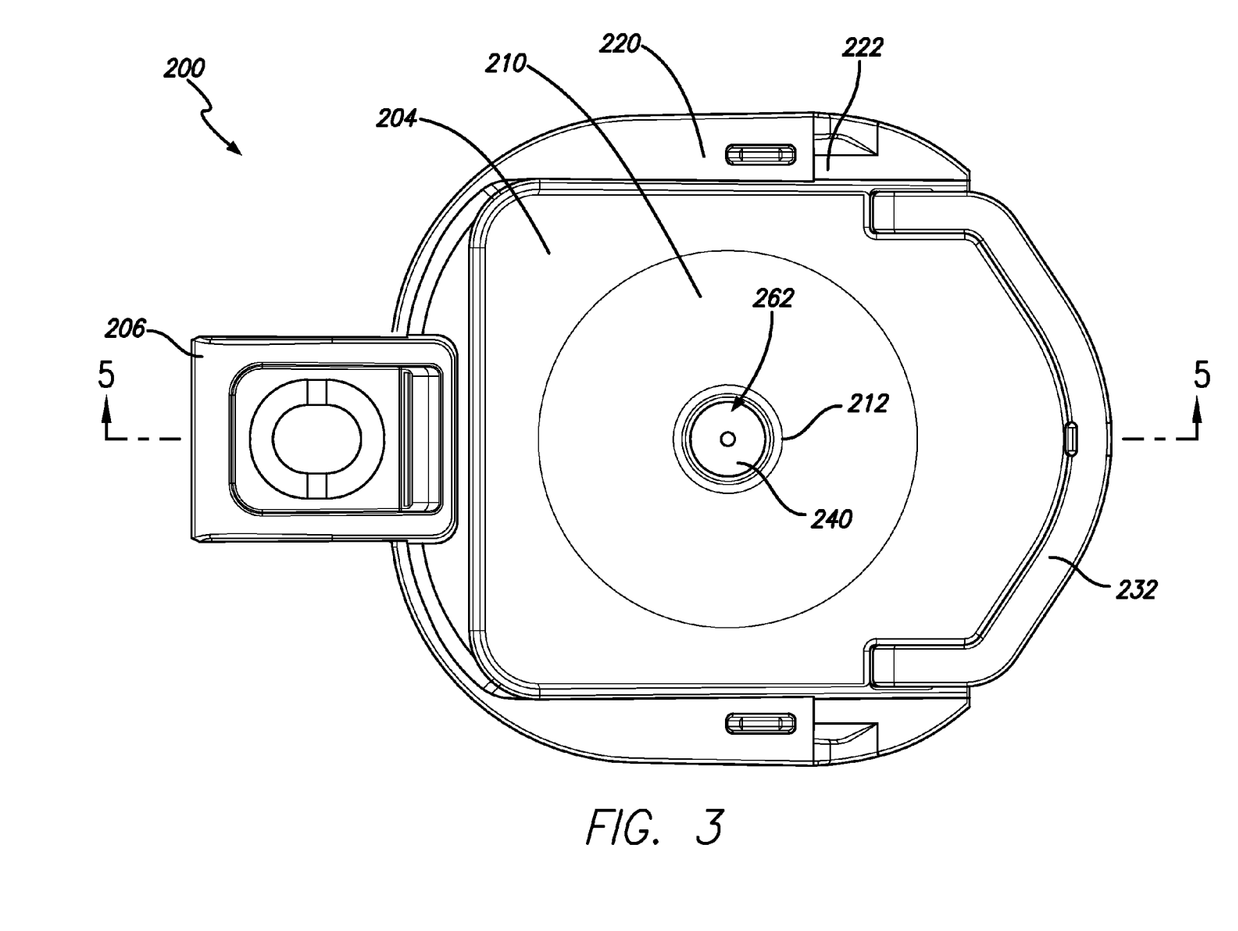
FIG. 3 is a top plan view of the holder showing the handle latch in relation to the base with the cover attached thereto.

FIG. 3 is a top plan view of the holder 200. The top planned view shows the location of the cover 204 on top of the base 220 in the generally centralized location of the recessed area 210. The locking handle 232 is used to secure the cover to the base for use in inserting the drawer 200 into the brewer. Since the cover 204 is not securely attached or sealed to the base 202, the handle 232 helps retain the cover 204 in a closed position. The handle 232 is also used at the end of a brew cycle to help facilitate removal of the used cartridge from the chamber. In this regard, the handle is lifted up to help disengage the cover 204 from the base. Lifting up on the handle also helps to move a sleeve 296 (See FIG. 4) which is movably positioned within the chamber 260 from the base 202. This allows the user to have a gripping structure 232 when lifting up along the axis of travel 250 relative to the shaft 252.

With further reference to the figures, a top nozzle or top probe 262 and gasket 264 are retained in the central aperture 212. As shown in the cross-sectional figure of FIG. 5, the aperture 212 is sized and dimensioned to allow a shaft 268 of the probe 262 to extend therethrough. The probe 262 includes a head 270 positioned on the outside portion of the cover 204 while the shaft 268 of the probe 262 generally extends and is positioned inside of the cover 204 during a brewing process. Spaced apart ribs 274 (see also FIGS. 6 and 7) are provided on an underside of the head 270 to allow for a standoff or vertical dimension to be retained between the head and a sump area 280 of an aperture 212.

The recessed area 210 is coupled to a spray head of the brewer. The spray head delivers water to the recessed area which flows, is driven, and drains through the sump and around the ribs for passage along the probe. The probe includes channels 282 which are generally axially aligned with the shaft 260 for delivering water to the cartridge. The multiple channels provide multiple paths for the introduction of water to the coffee packaged in and retained it the cartridge 294. This is in contrast to prior art probes which included only a single path of water into the brewing substance. Water delivered to the cartridge infuses substance retained in the cartridge 294 which can then be dispensed through an outlet probe 290.

Figure 6:
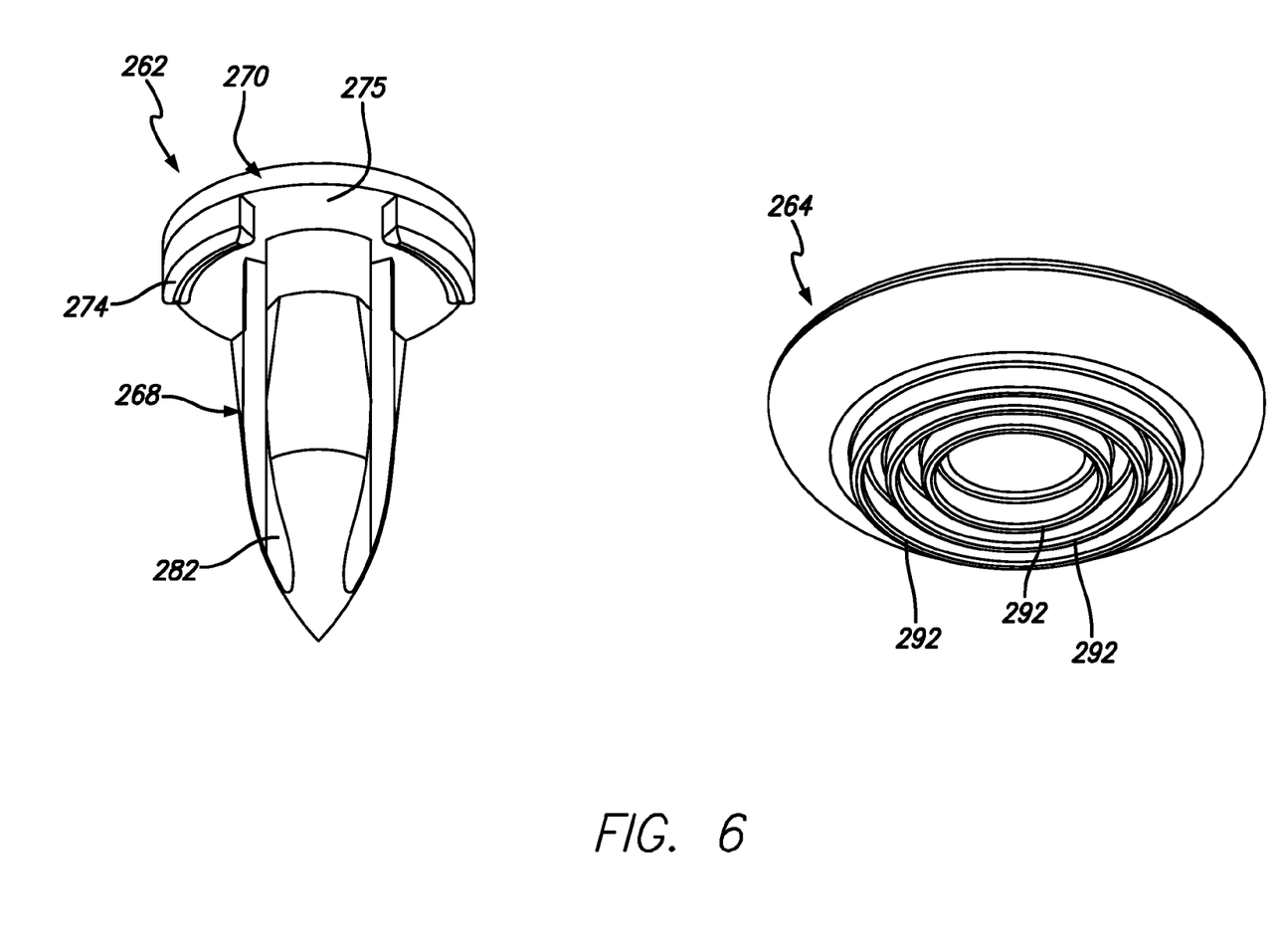
FIG. 6 is an enlarged perspective view of the probe and gasket as shown in the preceding figures, the probe including a shaft with channels axially aligned with the shaft extending from a head under which are provided ribs to provide a standoff and drainage from a corresponding spray head used to add water to the holder and to flow through and around the ribs to the channels for dispensing into a cartridge, the gasket including co centered ribs to provide a sealing effect of the probe against a corresponding cartridge.
Figure 7:
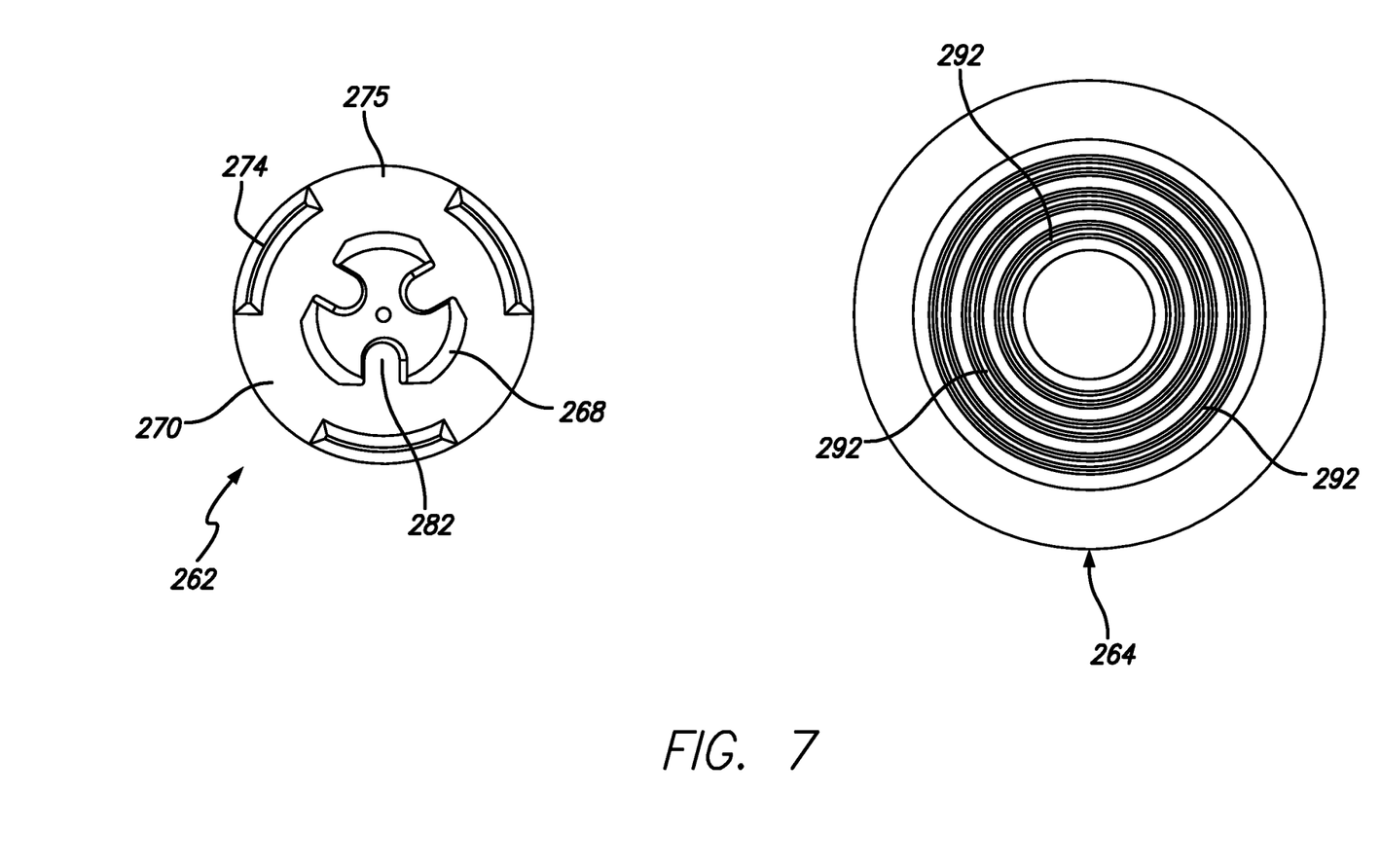
FIG. 7 is a planned view of the probe and gasket as shown in FIG. 6.

As shown in FIGS. 6 and 7, the underside of the head 270 shows the spaced apart ribs 272. In addition to providing a standoff, the ribs 274 also provide a path which distributes water through the space between pairs of ribs, the space 275 between pairs of ribs to flow around and evenly distribute to the corresponding channels 282. The ribs 274 are offset relative to the channels 282 so as to additionally limit direct flow but allow distribution to the channels 282. This helps facilitate a more even and distributed flow of water from the probe into the cartridge. Even flow and distribution of water helps to facilitate thorough wetting and/or saturation of the material retained in the cartridge for enhanced beverage extraction from the ingredient retained in the cartridge. Additionally, although not explicitly shown in the present drawings, the channels 282 could be spirally oriented, instead of linearly or axially oriented as shown, for the purpose of inducing a spiral or at least partially angular flow from the channel 282 into the brewing substance retained in the cartridge. Such angular introduction of water into the cartridge may help to move brewing substance within the cartridge. Operation of such spirally oriented channels may need to be designed or tuned depending on the type of substance into which the water is distributed, the fullness of the packaging of substance within the cartridge, particle size, and other factors.

FIGS. 6 and 7 show additional features clarifying the structures of the probe 262 and the gasket 264. The gasket includes a series of concentric walls or ridges 292 which seal against a top cover 303 of the cartridge portion for preventing leakage of water there through. The ribs 292 are flexible and provide some degree of conformance with irregularities in the abutting surface 303 of the cartridge. Because the channels 282 of the probe 262 are not enclosed cannulae, the gasket helps to close one end of the chamber providing a more enclosed passage through which water may flow.

Figure 5:
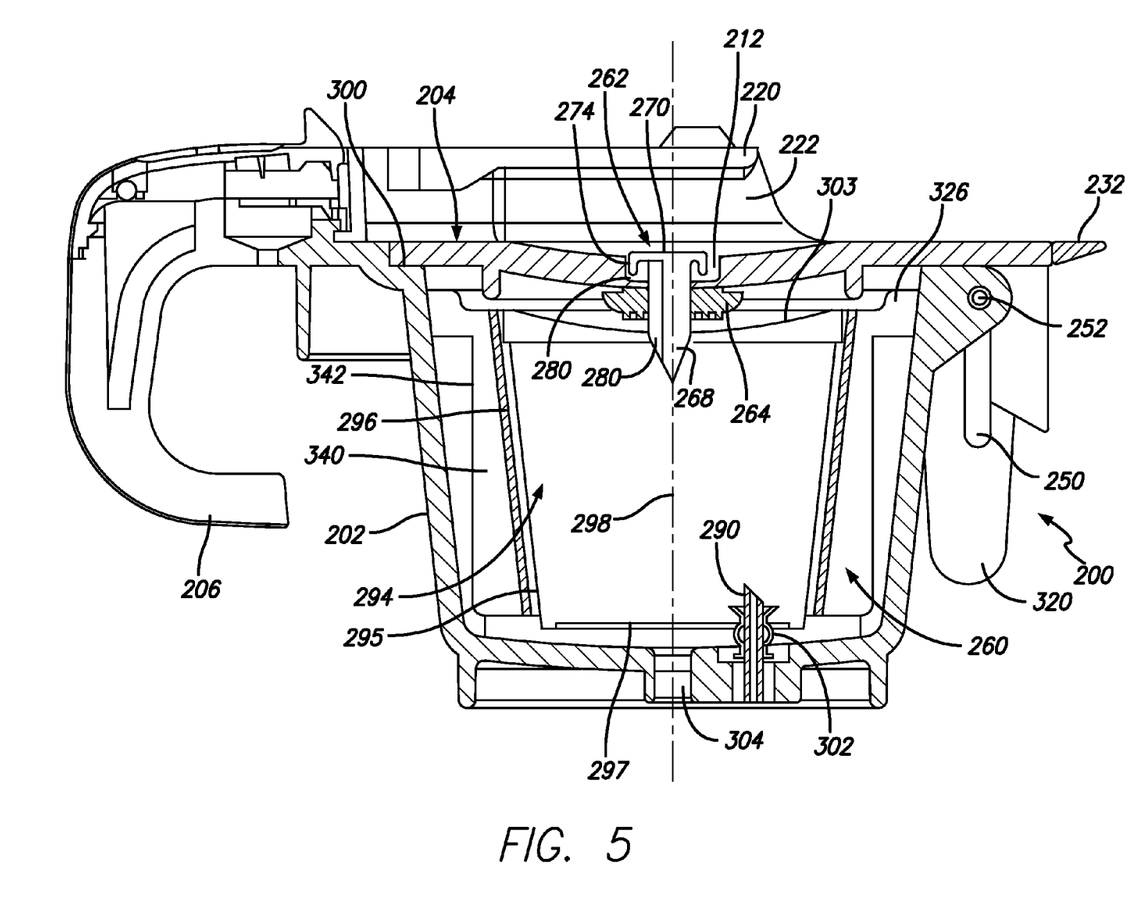
FIG. 5 is a cross-sectional side elevational view taken along line 5-5 in FIG. 3 showing the cover installed over the chamber of the base in the first step of the brewing process in which the with the probe is moved through a top portion of a cartridge to deliver water t the inside of the cartridge, no seal being provided between the cover and base components, a central drain aperture being provided in the lower portion of the base to allow for the drainage of moisture or beverage which might collect but not flow through the lower probe, to drain out of the holder.

With reference to FIG. 5, the cross-sectional view shows a cartridge 294 retained in a sleeve 296 axially 298 aligned in the chamber 260. As can be seen in this cross-sectional view, the cover 204 is not sealed to the base. No gasketing, baffling, or other seals are provided. The cover merely sits on top of the opening 300 around the perimeter of the chamber. The absence of gasketing or other seals allows for communication with the surrounding ambient atmosphere. Sealing of the chamber could tend to prevent free-flow and drainage of liquid from within the chamber. Water dispensed through the water inlet aperture 212 flows into a cartridge 294 retained in the chamber. Beverage is mixed with the ingredients, infused or otherwise enjoined to produce a beverage substance. The lower probe 290 extends through a wall of the cartridge. Beverage collecting within the cartridge drains therefrom. While a form of gasket 302 is provided around the lower probe 290 the method of dispensing water from the spray head to the cartridge may cause some degree of overflow. Also, some moisture may accumulate within the chamber. Any beverage or other moisture such as condensation that accumulates within the chamber can freely flow from a bottom drain 304. The communication of the chamber, central drain and upper portions of the holder 200 with ambient atmosphere allows any accumulation to flow out of the chamber. Absence of communication with ambient atmosphere could prevent the passage of this liquid. This could be undesirable as it may provide a medium for growths if the holder is not properly used and maintained.

Figure 8:
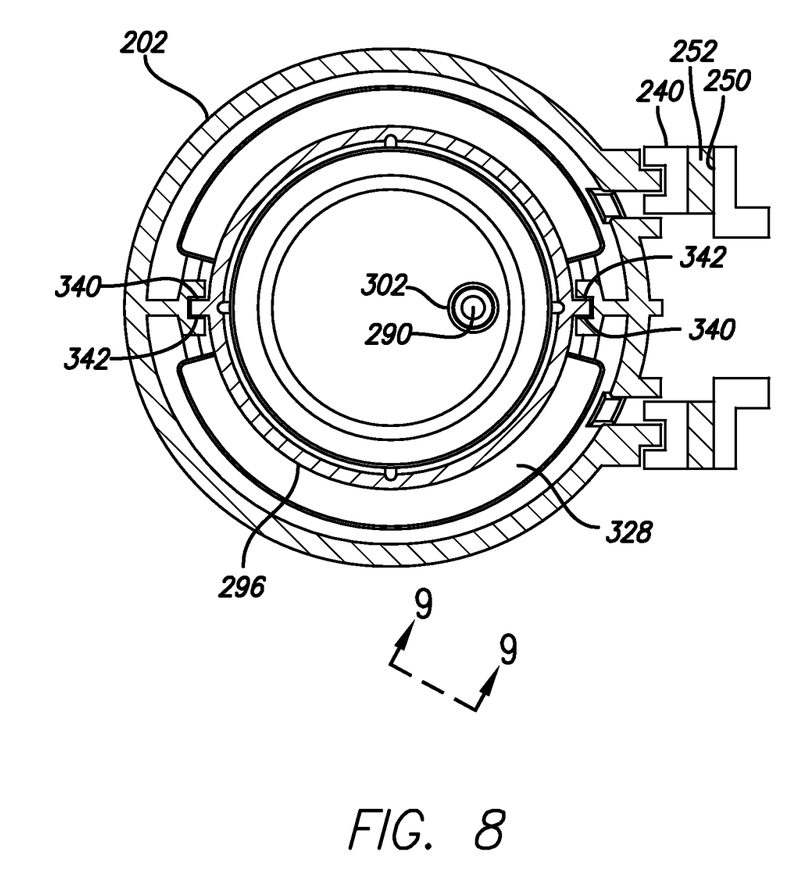
FIG. 8 is a cross-sectional plan view taken along line 8-8 in FIG. 1.
Figure 9:
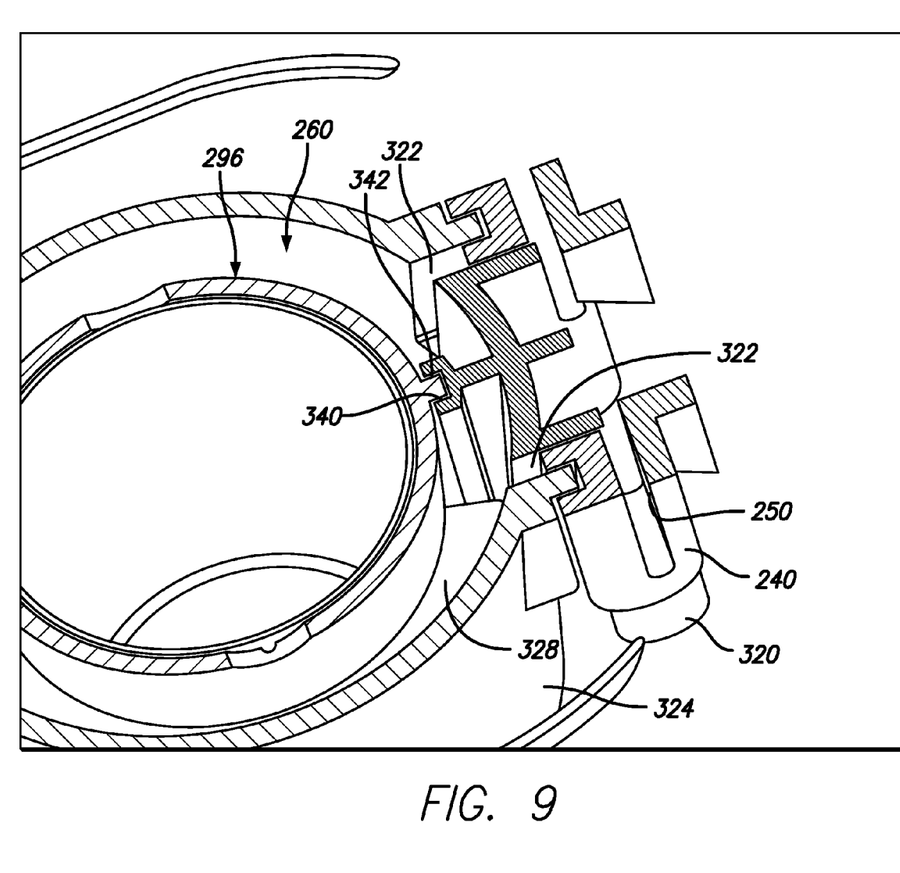
FIG. 9 is a cross-sectional perspective view taken generally along line 9-9 in FIG. 8.

With reference to FIGS. 8 and 9, the hinge assemble 230 also provides a feature for helping to vertically and axially displace the sleeve 296 relative to the base 202. As shown in the figures, the outer hinge portion 240 also includes extending arms 320. The extending arms can be positioned through slots 322 extending through a wall 324 of the base 202. The arms extending through the base engage between an upper rim 326 and a lower rim 328. Engagement of these arms in a generally circular groove 330 between the upper and lower rims 326 through 328 promotes movement of the sleeve 296 upwardly. The sleeve maintains its axial generally vertical movement by engagement of ribs 340 in corresponding channels 342. The movement of the sleeve relative to the base 202 helps to present the cartridge retained in this sleeve for removal. It also provides a target in which to insert a cartridge for brewing purposes.

In use, the holder 200 of the present disclosure receives a cartridge for use in producing a beverage. The holder 200 can accommodate a variety of cartridges. Additionally, the sleeve 296 may be configured to hold one or more cartridges or may be changeable to accommodate different cartridge configurations. In this regard, one sleeve could be provided to accommodate a K-Cup® (K-Cup® is a registered trademark of Keurig Incorporated) cartridge whereas an alternate sleeve could be sized and dimensioned to accommodate a Bob-Cup cartridge (Bob-Cup is a trademark of Bodecker Brewed).

The multiple purpose accessory configuration of the drawer 200 can accommodate a variety of cartridges having a variety of formats. The use of the sleeve 296 can also allow for configurations such as the Bob-Cup to position a probe at a different angle or from a different direction to puncture or otherwise open the cartridge. For example, it is possible to provide the mechanical structures to receive a cartridge in the sleeve and allow movement of the sleeve relative to the chamber to cause peeling, slicing, or otherwise opening of the cover from the cartridge and a similar action on the wall 295 or base 297 of the body of the cartridge 294.

Other forms of cartridges are also available and all should be able to be used with the present device. For example, cartridges which do not require puncturing of a lower portion could be used with the present retaining device. In this regard, such a cartridge is formed with a rim and a cover such as used with the present cartridges 294. However, no cup or body is provided with the cartridge and a filter material is merely attached to and suspended from the rim. In this regard, piercing the cover of such a cup-less cartridge allows water to be injected into the brewing substance retained in the cartridge and allows the brewing substance to drain through the filter material and out through the hole 304 in the lower portion of the body.

Similarly, a variety of refillable cartridges have been developed for use with Keurig® brewers (Keurig is a registered trademark of Keurig Incorporated). Such refillable cartridges could be used with the present retaining device or, if necessary, a retaining device in which the sleeve 296 is substituted to be sized and dimensioned for one or more types of cartridges. Additionally, if alternative cartridges are formed with filter structures extending along the sides of the cartridge the sleeve 296 can be sized and dimensioned to provide a radial dimension or gap between the outside of such filter walls and the inside of the sleeve. This will accommodate passage of brew dispensed from the filter walls for draining through the hole 304. The top edge or rim of such a cartridge being retained along the upper edge of the sleeve so as to securely retain the cartridge during the brewing process. The walls of the sleeve can be flared outwardly and downwardly towards the hole 304 to provide additional passage of beverage away from the cartridge filter walls.

Figure 4:
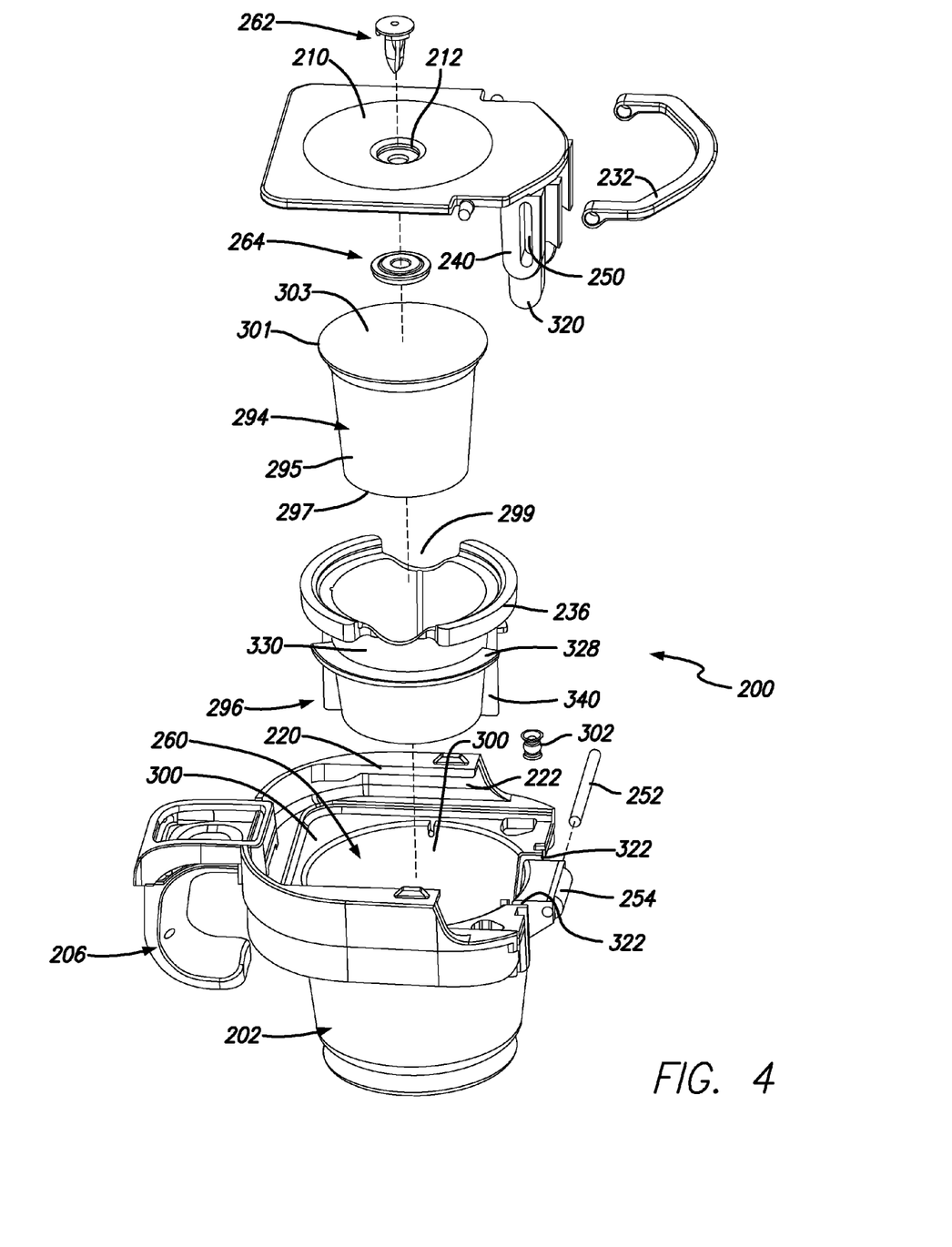
FIG. 4 is an exploded perspective view of the holder as shown in FIGS. 1-3 in which a sleeve is projected relative to the base and a cover showing a cartridge relative to the assembly and a nozzle or probe removed from the water inlet aperture with a gasket used with the probe.

As shown in FIG. 4 the sleeve 296 includes a pair of recesses 299 which allow a user to grip a side rim 301 of a corresponding cartridge after it is used in a brewing cycle. Movement of the sleeve upwardly as provided by the structures of the present disclosure facilitates movement and positioning of the recesses 299 for easy access by the user by reaching an area of the mouth 300.

Once the cover 204 is displaced from the base 202 a cartridge can be placed in the sleeve 296. As the cover 204 closes over the chamber the sleeve can move relative to the base 202 to engage one or more probes for introducing water to the cartridge. Movement of the sleeve carrying the cartridge can also provide one or more punctures, openings or other access to the cartridge to allow for a drainage path of beverage from the cartridge.

The holder 202 carrying the cartridge is inserted into the brewer. Water is then sent from the brewer for delivery to the holder. Water infusing the cartridge flows there through and exits through a drain or filter walls, depending on the cartridge design. The holder is not sealed and as such, communicates with the ambient atmosphere. This allows for free-flowing drainage from the cartridge and flow of drainage from a bottom drain 304 for any fluids or beverage which may build up or otherwise accumulate during the process between the outer walls of the sleeve and the inner walls of the chamber.

After completion of a brewing process, the cover can be displaced from the base causing the arms of the hinge assembly to engage in the grove between the upper and lower rims on the sleeve thereby promoting vertical axial movement of the sleeve relative to the chamber. This movement helps to facilitate placement of the cartridge for removal and positioning of the sleeve to receive the next cartridge.

Additionally, it should be noted that the retaining device 200 is structured and the dimensioned so that the characteristics of the device facilitate engagement of the probes 262, 290 with the cartridge 294 so as to first penetrate the top cover 303 of the cartridge 294 before a wall 295 or base 297 is penetrated. Additionally, due to the relatively thin, flexible and easily penetrated nature of the material used in the cover 303 compared to the much heavier more durable material used in the wall 295 or base 297 there is a natural tendency to puncture the cover 303 first. Even if the cover is tightly retained over the base or slightly inflated due to out gassing of gasses from the material retained in the cartridge, the cover 303 will be penetrated first followed by penetration of the bottom 297 or wall 295 after penetration of the cover 303. In fact, the out gassing of material may tend to pressurize the chamber slightly thereby presenting the cover 303 in a convex orientation (compared to a flat or concave presentation shown in FIG. 5). The convex orientation of the cover 303 will further enhance the penetrating sequence of the cover 303 being penetrated first.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

The invention claimed is:

1. A cartridge retaining device for use with a beverage brewer comprising
a holder having a base and a chamber in the holder for housing a cartridge,
a cover coupled to the holder for movement with respect to the holder to open and close the chamber so that the cartridge can be inserted into the chamber and removed from the chamber, the cover having an aperture,
a top probe in the aperture, the top probe having an exterior surface configured to distribute flow of liquid from the top probe into the cartridge, the top probe being configured to penetrate a top cover of the cartridge,
the base having an outlet probe configured to penetrate the cartridge and configured for allowing brewed beverage to exit the cartridge.

2. The cartridge retaining device of claim 1 wherein the cover is coupled to the base via a hinge.

3. The cartridge retaining device of claim 1 wherein the aperture is surrounded by a recessed area.

4. The cartridge retaining device of claim 1 wherein the base has a drain aperture for allowing moisture within the chamber to drain from the chamber.

5. The cartridge retaining device of claim 1 wherein the top probe has a channel for distributing the flow of liquid into the cartridge.

6. The cartridge retaining device of claim 5 wherein the top probe channel has a linear shape.

7. The cartridge retaining device of claim 5 wherein the top probe channel has a spiral shape.

8. The cartridge retaining device of claim 5 wherein the top probe has a plurality of channels.

9. The cartridge retaining device of claim 8 wherein the top probe has a plurality of spaced apart ribs for substantially evenly distributing flow of liquid to the channels.

10. The cartridge retaining device of claim 1 wherein the cover is coupled to a hinge assembly configured to allow a vertical movement and hinged displacement of the cover relative to the base.

11. The cartridge retaining device of claim 10 wherein a handle is provided on the cover, the handle is located to enable the cover to be lifted to disengage the cover from the base.

12. The cartridge retaining device of claim 11 wherein the handle is provided so that lifting the handle facilitates removal of the cartridge from the chamber.

13. The cartridge retaining device of claim 12 wherein lifting the handle facilitates movement of a sleeve movably positioned within the chamber.

14. The cartridge retaining device of claim 1 comprising a gasket in the aperture surrounding the top probe, the gasket having ridges configured to seal against a top cover of the cartridge.

15. A method using a cartridge retaining device with a beverage brewer, the method comprising the steps of
providing a beverage brewing device having a reservoir for heated liquid and a spray head for dispensing the liquid from the reservoir to a beverage making substance,
providing a holder having a base, a cover and a chamber in the holder for housing a cartridge, the holder being removably coupled to the beverage brewing device,
moving the cover with respect to the holder to close the chamber and to cause a cartridge in the chamber to be penetrated by a top probe in an aperture in the cover, the top probe having multiple channels for distributing flow of the liquid from the top probe into the cartridge,
dispensing liquid from the spray head to the top probe with the top probe creating multiple paths for distributing the flow of liquid into the cartridge.

16. The method of using a cartridge retaining device of claim 15 wherein the dispensing liquid step comprises providing the liquid to a recessed area surrounding the aperture.

17. The method of using a cartridge retaining device of claim 15 wherein the dispensing liquid step comprises moving the liquid along the multiple linear paths on an exterior surface of the top probe.

18. The method of using a cartridge retaining device of claim 15 wherein the dispensing liquid step comprises moving the liquid along the multiple paths, which paths extend spirally on an exterior surface of the top probe.

19. The method of using a cartridge retaining device of claim 16 wherein the dispensing liquid step comprises providing spaced ribs in the recessed area so that liquid is dispensed equally between spaces between ribs and is dispensed equally among the multiple channels.

20. The method of using a cartridge retaining device of claim 15 further comprising lifting a handle provided on the cover to open the cover with respect to the holder and to move the cartridge to a position facilitating removal of the cartridge.

21. A beverage brewer in combination with a cartridge retaining device comprising,
   a beverage brewer having a reservoir for heated liquid and a spray head for dispensing the liquid from the reservoir to a beverage making substance,
   a holder having a base, a cover and a chamber in the holder for housing a cartridge, the holder being removably coupled to the beverage brewing device, and
   a probe in an aperture in the cover, the probe having a plurality of channels extending into a cartridge and the channels distributing liquid from the spray head into the cartridge.

22. The beverage brewer in combination with a cartridge retaining device of claim 21 comprising a gasket in the aperture surrounding the probe, the gasket having ridges configured to seal against a top cover of the cartridge.

23. The beverage brewer in combination with a cartridge retaining device of claim 21 wherein plurality of channels are on an exterior surface of the top probe.

* * * * *